July 25, 1950 W. SWIFT 2,516,731
BORING AND OTHER MACHINES
Filed March 28, 1946 2 Sheets-Sheet 2

Inventor
W. Swift
By Gasent Downing Duckett
attys

Patented July 25, 1950

2,516,731

UNITED STATES PATENT OFFICE 2,516,731

BORING AND OTHER MACHINES

William Swift, Birmingham, England, assignor to Joseph Lucas Limited, Birmingham, England Application March 28, 1946, Serial No. 657,751
In Great Britain February 21, 1945

Section 1, Public Law 690, August 8, 1946
Patent expires February 21, 1965

1 Claim. (Cl. 77—3)

This invention relates to machines for performing boring or other cutting operations on work pieces, and of the kind in which the cutting tool is carried by a rotary and axially slidable spindle. In some machines of this kind provision is made whereby in each cycle of operations the spindle receives a continuous axial movement through a predetermined range. For some purposes, however, it is required to be able to arrest the axial movement of the tool at one or more positions throughout the range, or to move the tool axially through a distance which is less than the range of movement of the spindle, and without interfering with the normal movements of the spindle. For example, in some cases the machine may be required for drilling a hole in a work piece. This operation requires the whole of the range of axial movement of the spindle to be utilised. In other cases it may be required, by means of the same machine, to form in a hole, one or more circumferential grooves, requiring either no axial movement of the tool relatively to a stationary work piece, or an axial movement which is less than the attendant movement of the spindle. The object of the present invention is to provide a machine whereby the above described, or other analogous requirements can be met in a simple and convenient manner.

Figure 1:
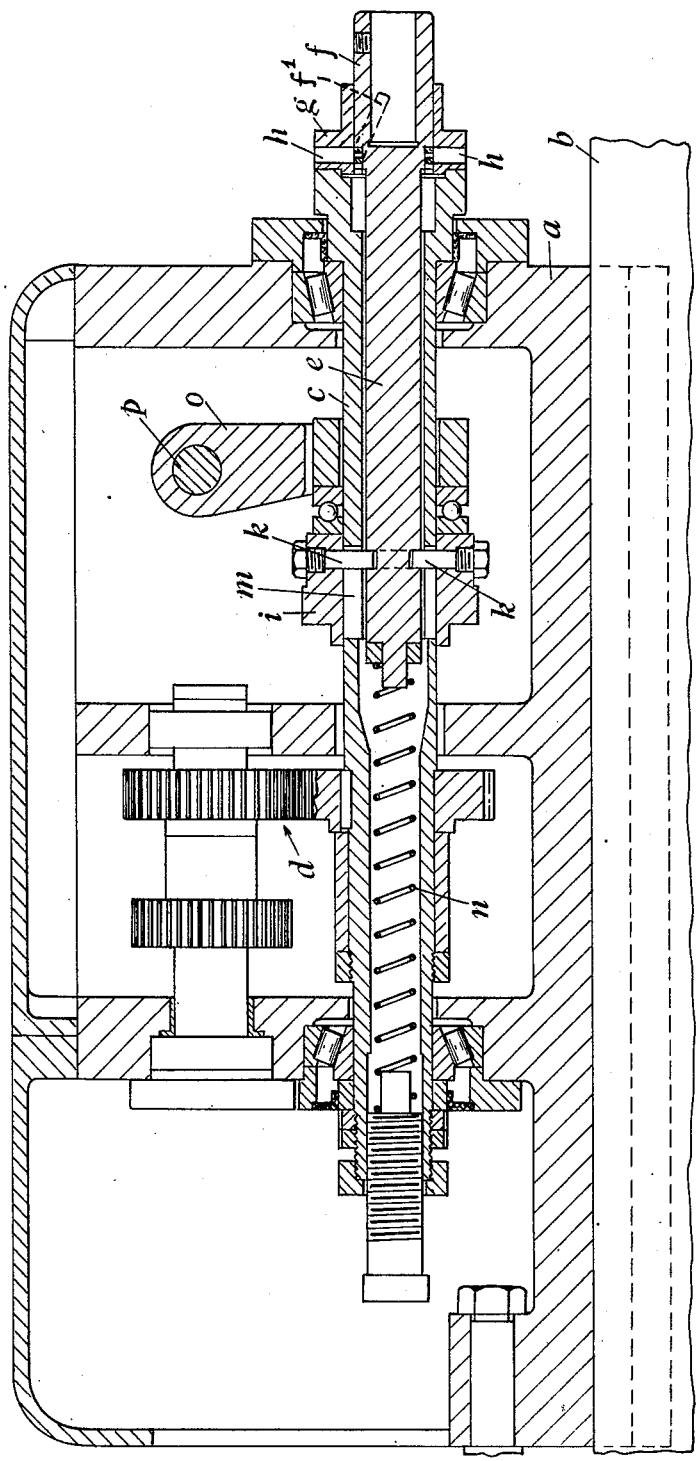
Figure 2:
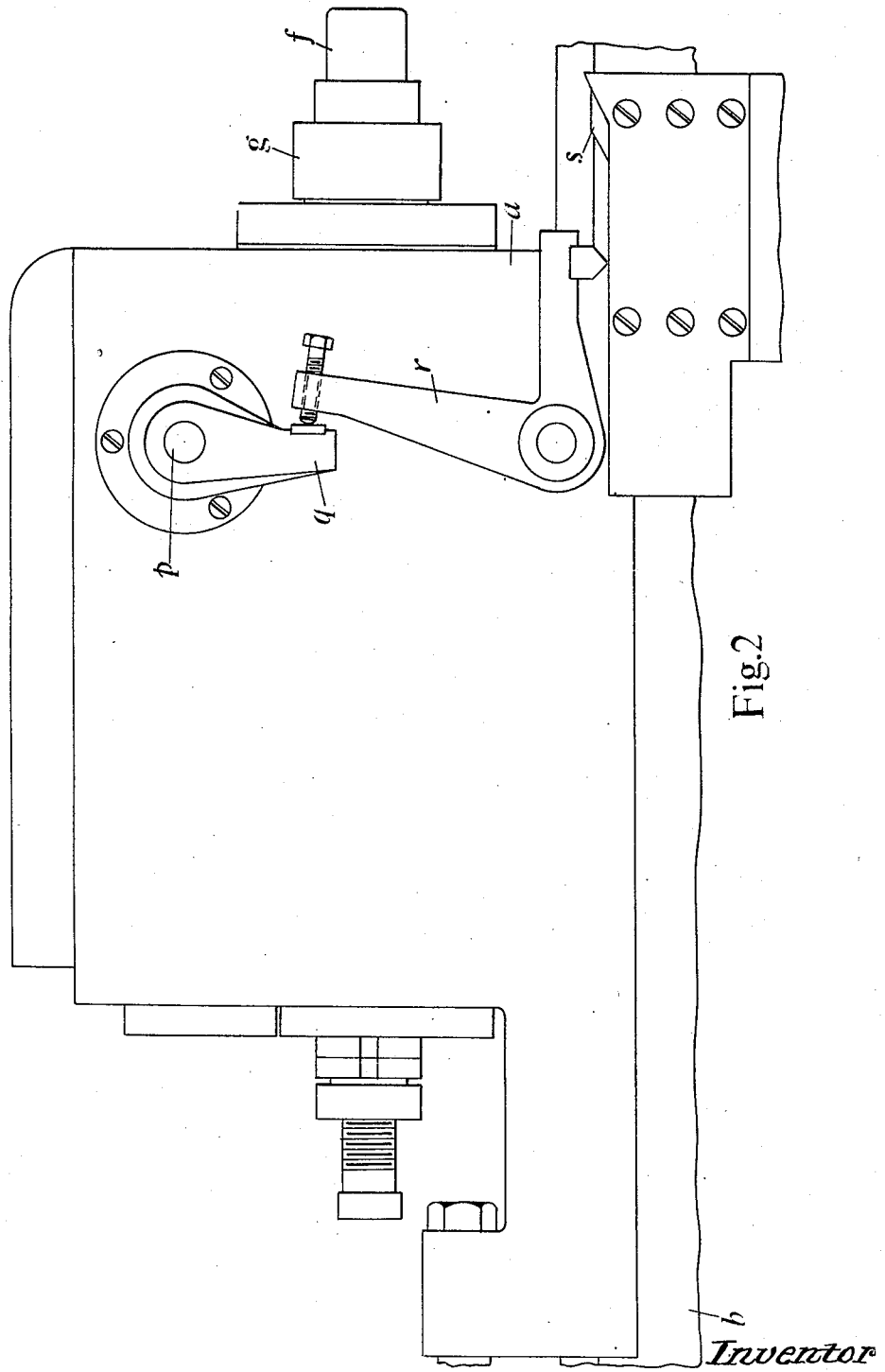

In the accompanying drawings:

Figure 1 is a sectional side elevation and Figure 2 a side elevation illustrating one embodiment of the invention.

In carrying the invention into effect as shown in the drawings, I employ a headstock $a$ which is slidably mounted on a bed $b$ so that it can be moved towards and away from a stationary work piece which is carried on the bed by an adjustable slide or otherwise. In this headstock is mounted the main spindle $c$ whose axis coincides with the direction of movement of the headstock. The headstock is also provided with gearing as $d$ for rotating the spindle from any convenient source of motion, and in association with the headstock and bed is provided any convenient means (not shown) for sliding the headstock through a predetermined range in each cycle of operations.

Within the bore of the main spindle $c$ is inserted the tool-carrying spindle $e$. The forward end of the spindle $e$ is formed with an eccentric enlargement $f$ which is adapted for the attachment thereto (by a chuck or otherwise) of the cutting tool. This end of the spindle $e$ is carried by an eccentrically bored nose piece $g$ secured to the forward end of the spindle $c$. The amount of eccentricity is such as will enable the cutting tool to be fed radially into the work piece to the desired extent by relative angular movement of the two spindles.

The necessary driving connection between the two spindles is conveniently arranged at the forward end of the main spindle, and in the form illustrated this connection is effected by one or more radial pins $h$ or keys extending from the nose piece $g$ into one or more helical grooves $f'$ formed in the adjacent circumferential surface of the part $f$ of the tool-carrying spindle. Further this groove or each of them is so shaped or disposed that axial movement of the spindle $e$ relatively to the main spindle $c$ is accompanied by the desired relative angular movement.

To effect the sliding of the tool-carrying spindle $e$ relatively to the main spindle $c$, I mount on the portion of the main spindle within the headstock a slidable sleeve $i$ having a key or keys $k$ extending through a longitudinal slot $m$ or slots in the main spindle $c$ into engagement with a circumferential groove in the tool-carrying spindle $e$. In addition a strong spring $n$ is arranged in the main spindle and adapted to exert endwise pressure on the tool-carrying spindle such as will tend to return the two spindles to their initial relationship.

For actuating the sleeve $i$, I employ a lever $o$ adapted to exert endwise pressure on the sleeve, and on the outer end of a spindle $p$ which carries the lever $o$ is secured another lever $q$ which co-operates with a bell crank lever $r$. The latter is arranged to co-operate with a stationary ramp $s$ on the bed of the machine (Figure 2), the ramp being so shaped and disposed as to cause the sleeve to be actuated at the desired interval during each cycle of operations.

To further elucidate the invention, I will now describe one kind of operation which the machine is required to perform. Let it be supposed that a cylindrical bore has already been formed in a work piece and that it is now required to form in the bore a circumferential groove, this groove being such that it requires for its formation only a radially outward movement of a tool having a suitably shaped cutting edge. This necessitates that while the groove is being cut there shall be not axial movement of the tool while in contact with the work piece. To meet this case, the above mentioned ramp $s$ is so shaped and placed, that after the tool has been brought to the appropriate position during the advance of the headstock towards the work piece, the tool-carrying spindle $e$ is moved rearwardly by the levers and sleeve $i$ at a rate which is equal to that of the forward movement of the headstock. Also the pin and groove connection between the forward ends of the two spindles is such that this relative axial movement of the two spindles is accompanied by relative angular movement sufficient to cause the tool to form a groove of the required depth. After the groove has been cut return movement of the headstock commences and the ramp allows the tool to resume its initial position under the action of the spring $n$. If it is required to form a broad groove in the bore of the work piece, the ramp is adapted first to effect the penetration of the work piece by the tool at the proper position in the manner above described and then to allow the tool to traverse along the bore to the required extent by joint movement of both spindles, the tool being subsequently retracted.

By this invention I am able to adapt machines of the kind specified to perform such operations as those described in a very simple and satisfactory manner. The invention is especially useful in machines in which the headstock carries a plurality of spindles arranged parallel with each other and each carrying a tool adapted to perform a particular operation in a work piece, the latter being moved from one position to another after each operation has been performed. For example, the sequence may involve the drilling of a bore in the first stage, necessitating the utilising of the whole of the sliding movement of the headstock, this operation being followed by one or more of the operations such as the one above described, and by my invention the same machine can be adapted to perform the whole range of operations. The invention is not, however, restricted to the example described as subordinate details may be modified to meet different requirements.

Having thus described my invention what I claim as new and desire to secure by Letters Patent is:

In a boring or other machine of the kind specified, the combination of a rotatable hollow main spindle, a slidable headstock in which said main spindle is rotatably mounted, a tool-carrying spindle which is eccentrically supported within and is rotatable with and relatively to said main spindle, said tool-carrying spindle being also capable of axial movement relatively to said main spindle, a direct helical connection between said main spindle and tool-carrying spindle so that relative axial movement thereof is accompanied by relative angular movement, a sleeve slidably mounted on said main spindle and connected to said tool-carrying spindle, and means for actuating said sleeve to impart axial movement to said tool-carrying spindle relatively to said main spindle for varying the angular position and the extent of traverse of said tool-carrying spindle.

WILLIAM SWIFT.

REFERENCES CITED

The following references are of record in the file of this patent:

UNITED STATES PATENTS

| Number | Name | Date |
| --- | --- | --- |
| 1,193,426 | Rollinson et al. | Aug. 1, 1916 |
| 1,226,164 | Austin | May 15, 1917 |
| 1,233,994 | Dow | July 17, 1917 |
| 1,794,080 | Langley | Feb. 24, 1931 |
| 2,182,770 | Woodcock | Dec. 5, 1939 |